United States Patent
Lin et al.

(10) Patent No.: US 6,790,506 B2
(45) Date of Patent: Sep. 14, 2004

(54) CARBON FIBER LAYER FOR ACOUSTIC DIAPHRAGM

(76) Inventors: Tung-Siang Lin, 1F, No. 23, Alley 7, Lane 106, Dung-Hu Rd., Taipei (TW); Chao-Hsien Lin, 5F, No. 337, Sec.4, Shin-Yi Rd., Taipei (TW)

( * ) Notice: Subject to any disclaimer, the term of this patent is extended or adjusted under 35 U.S.C. 154(b) by 0 days.

(21) Appl. No.: 10/414,652

(22) Filed: Apr. 16, 2003

(65) Prior Publication Data

US 2003/0211282 A1 Nov. 13, 2003

Related U.S. Application Data

(62) Division of application No. 09/832,383, filed on Apr. 11, 2001, now abandoned.

(30) Foreign Application Priority Data

Apr. 14, 2000 (TW) .......................... 89107034 A

(51) Int. Cl.⁷ .................................................. B32B 5/12
(52) U.S. Cl. ...................... 428/114; 181/169; 181/170
(58) Field of Search ................... 428/114; 181/169, 181/170; 381/426, 428

(56) References Cited

U.S. PATENT DOCUMENTS

| 4,362,081 A | 12/1982 | Hartry |
| 5,135,329 A | 8/1992 | Yuda |
| 5,823,624 A | 10/1998 | Dahlbacka |
| 5,866,272 A | 2/1999 | Westre et al. |

FOREIGN PATENT DOCUMENTS

| FR | 2620659 | 3/1989 |
| JP | 361087741 | 5/1986 |
| JP | 01204735 | 8/1989 |

*Primary Examiner*—Alexander S. Thomas
(74) *Attorney, Agent, or Firm*—Volpe and Koenig, P.C.

(57) ABSTRACT

A structure of an acoustic diaphragm adapted to be used in a planar diaphragm speaker is provided. The structure includes a bottom carbon fiber layer and a top carbon fiber disposed on the bottom carbon fiber layer, wherein the fibers of the top carbon fiber layer and the fibers of the bottom fiber layer are parallel with each other.

8 Claims, 3 Drawing Sheets

CARBON FIBER LAYER FOR ACOUSTIC DIAPHRAGM

CROSS REFERENCE TO RELATED APPLICATIONS

This application is a divisional of U.S. patent application Ser. No. 09/832,383 filed on Apr. 11, 2001, abandoned, which is incorporated by reference as if fully set forth, and which claims priority to Taiwanese (R.O.C.) Patent Application No. 089107034 filed on Apr. 14, 2000.

FIELD OF THE INVENTION

The present invention relates to a structure of a carbon fiber molded acoustic diaphragm having high strength.

BACKGROUND OF THE INVENTION

Carbon fiber is widely used in fabricating sporting goods and military supplies because of its high strength, low weight and excellence in flexibility. For example, carbon fibers are added into aluminum alloy to produce a golf shaft or into plastic materials to form a carbon fiber reinforced plastic (CFRP) for producing tires. In recent years, carbon fibers are also employed as acoustic diaphragms of planar diaphragm speakers. The acoustic diaphragm of a typical planar diaphragm speaker is relatively stiff and substantially flat and supported by a frame. The acoustic diaphragm is vibrated by an electromagnetic driver coupled to the rear surface thereof so as to emit sound. Generally, the acoustic diaphragm is conducted by combining at least two carbon fiber layers.

FIGS. 1 and 2 show two types of acoustic diaphragm according to prior art. Referring to FIG. 1, the acoustic diaphragm 10 is formed by coupling two carbon fiber layers 11 and 12. The fibers 110 of the upper carbon fiber layer 11 and the fibers 120 of the lower carbon fiber layer 12 are perpendicular to each other. Since the applied stresses on the both layers 11 and 12 are usually not uniform, the ends will be raised and therefore could not be used in a planar diaphragm speaker. Referring to FIG. 2, an acoustic diaphragm 20 is formed by coupling three carbon fiber layers 21, 22 and 23 from top to bottom. The fibers 210 of the top layer 21 and the fibers 230 of the bottom layer 23 are parallel with each other but perpendicular to the fibers 220 of the medium layer 22. It is known in the art that the thickness of each layer is about 0.1 mm. The three carbon fiber layers 21, 22 and 23 are then subjected to a heating and pressing process to form the composite layer 20 to be used as an acoustic diaphragm. It is found that the structure of the carbon fiber composite layer 20 could only slightly increase the strength thereof; however, the three layers' structure brings about increase in weight.

Therefore, the present invention provides an improved structure of an acoustic diaphragm for overcoming the problems described above.

SUMMARY OF THE INVENTION

It is an object of the present invention to provide a method for forming a composite carbon fiber layers, wherein the composite carbon fiber layer could be used as an acoustic diaphragm adapted to be used in a planar diaphragm speaker.

It is another object of the present invention to provide a structure of an acoustic diaphragm, which is a composite carbon fiber layer of two carbon fiber layers.

It is another object of the present invention to provide a structure of an acoustic diaphragm having high strength.

In accordance with an aspect of the present invention, there is provided a method for forming a composite carbon fiber layer. The method includes steps of providing two carbon fibers layers having fibers in parallel with each other and disposed in a stacked form, and heating and pressing the two carbon layers simultaneously to form the carbon fiber composite layer.

Preferably, the heating and pressing step is carried out at about 130° C. under 300 psia for 60 minutes.

Preferably, the carbon fiber composite layer further includes a first vibration absorber layer between the top carbon fiber layer and the bottom carbon fiber layer. In addition, the carbon fiber composite layer further includes a second vibration absorber layer disposed on the top carbon fiber layer and a third vibration absorber layer disposed under the bottom carbon fiber layer.

Preferably, each of the first vibration absorber layer, the second vibration absorber layer and the third vibration absorber layer is made of high-density polyethylene (HDPE).

Preferably, the thickness of the top carbon fiber layer is about 0.1 mm and the thickness of the bottom carbon fiber layer is about 0.1 mm.

In accordance with another aspect the present invention, there is provided a structure of an acoustic diaphragm, which includes a bottom carbon fiber layer and a top carbon fiber layer disposed on the bottom carbon fiber layer, wherein the fibers of the top carbon fiber layer and the fibers of the bottom carbon fiber layer are parallel with each other.

Preferably, the acoustic diaphragm further includes a first vibration absorber layer between the top carbon fiber layer and the bottom carbon fiber layer. In addition, the acoustic diaphragm further includes a second vibration absorber layer disposed on the top carbon fiber layer and a third vibration absorber layer disposed under the bottom carbon fiber layer.

Preferably, each of the first vibration absorber layer, the second vibration absorber layer and the third vibration absorber layer is made of high-density. polyethylene (HDPE).

Preferably, the thickness of the top carbon fiber layer is about 0.1 mm and the thickness of the bottom carbon fiber layer is about 0.1 mm.

In accordance with another aspect of the present invention, there is provided a structure of an acoustic diaphragm adapted to be used in a planar diaphragm speaker. The structure includes a bottom carbon fiber layer having a first fiber direction, a first vibration absorber layer disposed on the bottom carbon fiber layer, and a top carbon fiber layer disposed on the bottom carbon fiber layer and has a second fiber direction, wherein the first fiber direction and the second fiber direction are parallel with each other.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENTS

Figure 1:
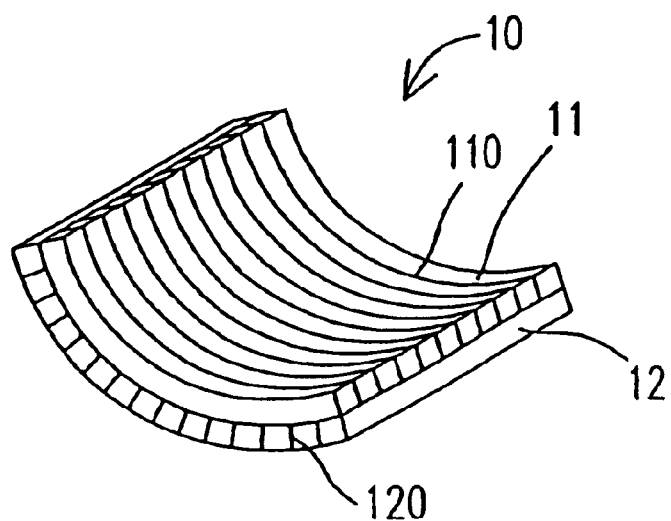
FIG. 1 is a view showing a structure of an acoustic diaphragm according to the prior art.
Figure 2:
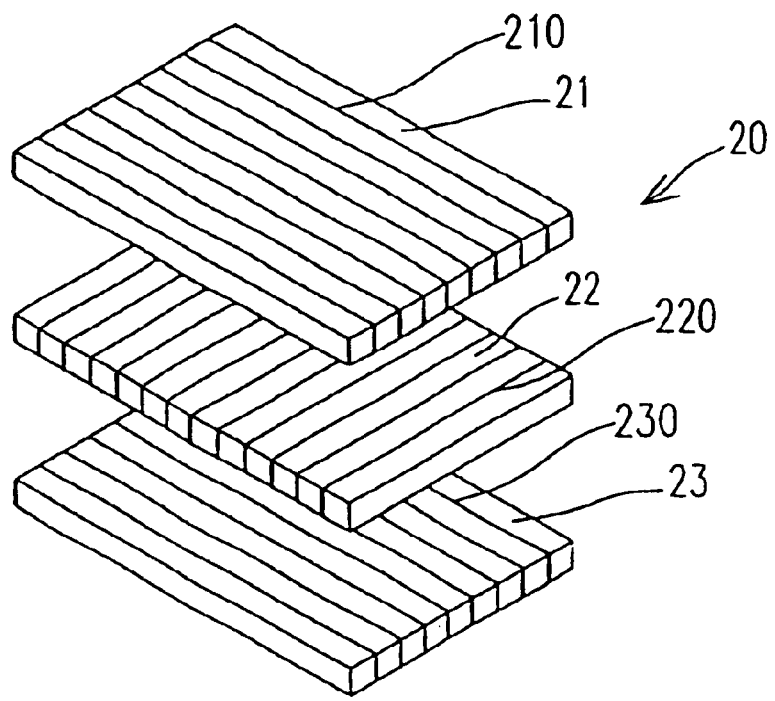
FIG. 2 is a view showing another structure of an acoustic diaphragm according to the prior art.
Figure 3:
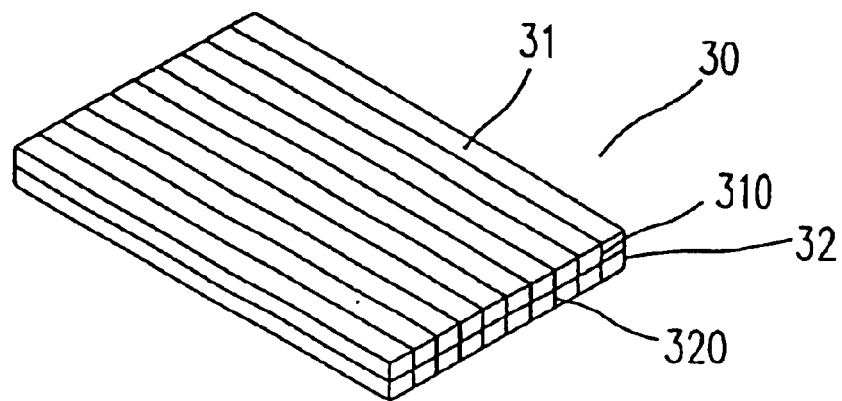
FIG. 3 is a perspective view showing the acoustic diaphragm including two carbon fiber layers according to the first embodiment of the present invention.

FIG. 3 is a perspective view showing the acoustic diaphragm including two carbon fiber layers according to the first embodiment of the present invention. In FIG. 3, the top carbon fiber layer 31 is disposed on the bottom carbon fiber layer 32. According to the present invention, the fibers of the bottom carbon fiber layer 32 toward a first direction 320 and the fibers of the top carbon fiber layer 31 toward a second direction 310, wherein the first direction 310 and the second direction 320 are parallel with each other.

Figure 4:
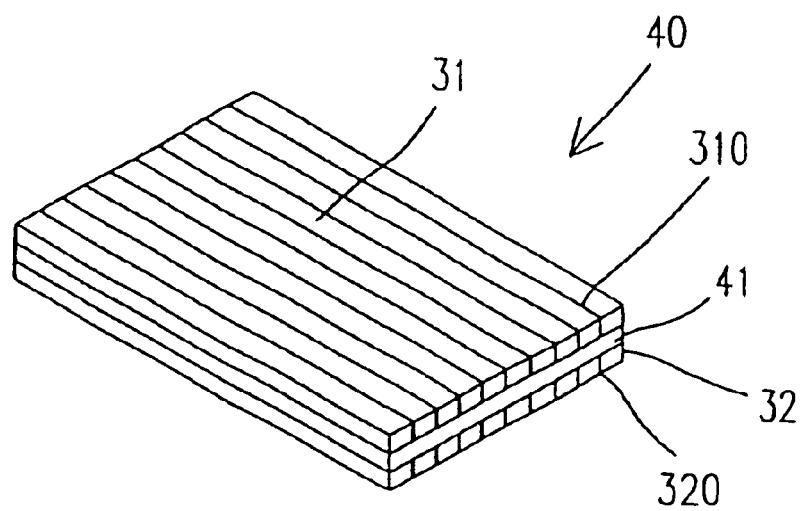
FIG. 4 is a perspective view showing the acoustic diaphragm according to the second embodiment of the present invention.

FIG. 4 is a perspective view showing the acoustic diaphragm according to the second embodiment of the present invention. The acoustic diaphragm 40 could further include a first vibration absorber layer 41 between the two layers 31 and 32, as can be seen in FIG. 4.

Figure 5:
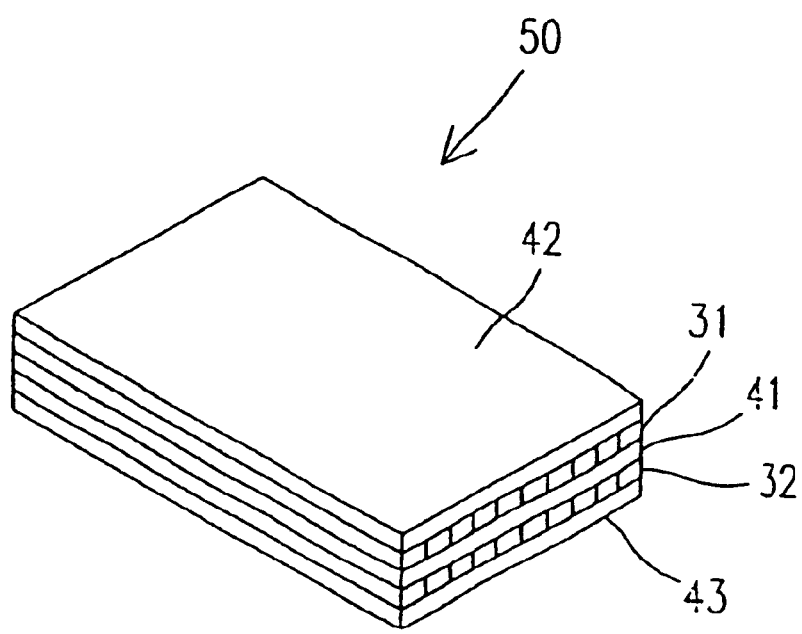
FIG. 5 is a perspective view showing the acoustic diaphragm according to the third embodiment of the present invention.

FIG. 5 is a perspective view showing the acoustic diaphragm according to the third embodiment of the present invention. The acoustic diaphragm 50 further includes a second vibration absorber layer 42 disposed on the top carbon fiber layer 31 and a third vibration absorber layer 43 disposed under the bottom carbon fiber layer.

The vibration absorber layers 41, 42 and 43 are preferably made of high-density polyethylene (HDPE) for damping the acoustic diaphragms 30, 40 and 50.

In accordance with the present invention, the connection of the two carbon fiber layers 31 and 32 in FIG. 3 are performed by heating and pressing simultaneously. Also, the three layers 31, 32 and 41 in FIG. 4 and the five layers 31, 32, 41, 42 and 43 in FIG. 5 are subjected to heating and pressing simultaneously to form the acoustic diaphragms 30, 40 and 50 respectively. The heating and pressing process is carried out at about 130° C. under 300 psia for 60 minutes.

Accordingly, the acoustic diaphragm of the present invention utilizes two carbon fiber layers whose fibers are parallel with each other. Such structure is lighter than the three layers' structure in the prior art and can prevent the ends of the two layers' structure from raising and bending. Furthermore, the acoustic diaphragm of the present invention has the advantage of higher strength. In addition, only two steps are required to form the composite carbon fiber layer, which is more convenient and to less time-consuming.

While the invention has been described in terns of what are presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structure.

What is claimed is:

1. A structure of an acoustic diaphragm adapted to be used in a planar diaphragm speaker, comprising:

a bottom carbon fiber layer;

a top carbon fiber layer disposed on said bottom carbon fiber layer, a first vibration absorber layer disposed between said top carbon fiber layer and said bottom carbon fiber layer;

a second vibration absorber layer disposed on said top carbon fiber layer; and a third vibration absorber layer disposed under said bottom carbon fiber, wherein the fibers of said top carbon fiber layer and the fibers of said bottom carbon fiber layer are parallel with each other.

2. The structure according to claim 1, wherein each of said first vibration absorber layer, said second vibration absorber layer and said third vibration absorber layer is high-density polyethylene (HDPE).

3. The structure according to claim 1, wherein the thickness of said top carbon fiber layer is about 0.1 mm.

4. The structure according to claim 1, wherein the thickness of said bottom carbon fiber layer is about 0.1 mm.

5. A structure of an acoustic diaphragm adapted to be used in a planar diaphragm speaker, comprising:

a bottom carbon fiber layer having a first fiber direction;

a first vibration absorber layer disposed on said bottom carbon fiber layer;

a top carbon fiber layer disposed on said bottom carbon fiber layer and has a second fiber direction;

a second vibration absorber layer disposed on said top carbon layer; and a third vibration absorber layer disposed under said bottom carbon fiber, wherein said first fiber direction and said second fiber direction are parallel with each other.

6. The structure according to claim 5, wherein each of said first vibration absorber layer, said second vibration absorber layer and said third vibration absorber layer is high-density polyethylene (HDPE).

7. The structure according to claim 5, wherein the thickness of said top carbon fiber layer is about 0.1 mm.

8. The structure according to claim 5, wherein the thickness of said bottom carbon fiber layer is about 0.1 mm.

* * * * *